United States Patent
Minamisawa et al.

(10) Patent No.: US 11,347,074 B2
(45) Date of Patent: May 31, 2022

(54) OPTICAL UNIT HAVING SHAKE CORRECTION FUNCTION

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 254 days.

(21) Appl. No.: 16/696,306

(22) Filed: Nov. 26, 2019

(65) Prior Publication Data
US 2020/0174272 A1 Jun. 4, 2020

(30) Foreign Application Priority Data

Nov. 30, 2018 (JP) .............................. JP2018-224949
Mar. 28, 2019 (JP) .............................. JP2019-062239

(51) Int. Cl.
*G02B 27/64* (2006.01)
*G03B 5/04* (2021.01)

(52) U.S. Cl.
CPC ............. *G02B 27/646* (2013.01); *G03B 5/04* (2013.01); *G03B 2205/0015* (2013.01)

(58) Field of Classification Search
CPC . G03B 5/04; G03B 2205/0015; G02B 27/646
See application file for complete search history.

(56) References Cited

U.S. PATENT DOCUMENTS

| 10,516,326 | B2* | 12/2019 | Han .................... H02K 41/0354 |
| 2011/0228111 | A1 | 9/2011 | Imagawa |
| 2015/0256727 | A1 | 9/2015 | Kim et al. |
| 2015/0370086 | A1* | 12/2015 | Hamada ............... H04N 5/2254 |
| | | | 359/557 |
| 2017/0052388 | A1 | 2/2017 | Kim et al. |
| 2017/0075130 | A1 | 3/2017 | Kim et al. |
| 2017/0171440 | A1* | 6/2017 | Park ..................... G02B 27/646 |

(Continued)

FOREIGN PATENT DOCUMENTS

| CN | 102196174 A | 9/2011 |
| CN | 104898347 A | 9/2015 |

(Continued)

OTHER PUBLICATIONS

CNIPA First Office Action for corresponding CN Application No. 201911200394.4; dated Jun. 17, 2021.

(Continued)

*Primary Examiner* — Clayton E. LaBalle
*Assistant Examiner* — Diana Hancock
(74) *Attorney, Agent, or Firm* — Cantor Colburn LLP (57) ABSTRACT

An optical unit having a shake correction function may include a movable body including an optical module, a fixed body that supports the movable body via a gimbal mechanism, and a shake correction drive mechanism that swings the movable body around a first axis and a second axis intersecting each other. The shake correction drive mechanism may be disposed on two intersecting faces out of four faces of the movable body. A first flexible printed circuit board may be led out from one of the two faces, of which the shake correction drive mechanism is not disposed on either.

6 Claims, 8 Drawing Sheets

(56) References Cited

U.S. PATENT DOCUMENTS

2018/0149881 A1* 5/2018 Kim .................... G02B 7/08
2018/0284477 A1   10/2018 Minamisawa
2019/0238728 A1*  8/2019 Hwang ............... G01B 7/003

FOREIGN PATENT DOCUMENTS

| CN | 108693677 A | 10/2018 |
| JP | 2010064176 A | 3/2010 |
| JP | 2011069915 A | 4/2011 |
| JP | 2014006522 A | 1/2014 |
| JP | 2017-066746 A | 3/2017 |
| KR | 10-2014-0027013 B2 | 3/2014 |

OTHER PUBLICATIONS

CNIPA Second Office Action for corresponding CN Application No. 201911200394.4; dated Nov. 5, 2021.

* cited by examiner

OPTICAL UNIT HAVING SHAKE CORRECTION FUNCTION

CROSS REFERENCE TO RELATED APPLICATION

This application claims priority under 35 USC § 119 to Japanese Application No. 2018-224949 filed on Nov. 30, 2018 and also to Japanese Application No. 2019-062239 filed on Mar. 28, 2019, the entireties of both of which are included herein by reference.

BACKGROUND

Field of the Invention

At least an embodiment of the present invention relates to an optical unit having a shake correction function to correct shake of an optical module.

Description of the Related Documents

Some optical units installed in portable terminals and mobile devices are each provided with a mechanism that corrects shake of a movable body including an optical module by swinging or rotating the movable body, to suppress disruption in an image captured while the portable terminal or mobile device is moving. Japanese Unexamined Patent Application Publication No. 2014-6522 (JP 2014-6522 A) discloses an optical unit having such a shake correction function. The optical unit having a shake correction function according to JP 2014-6522 A includes a gimbal mechanism that swingably supports a movable body and a shake correction drive mechanism that swings the movable body. The shake correction drive mechanism is a magnetic drive mechanism including magnets and coils.

According to JP 2014-6522 A, a case that is a component of the fixed body accommodates a shake correction drive mechanism, a gimbal mechanism, and a movable body (optical module). The shake correction drive mechanism includes magnets disposed on side faces of the movable body, and coils disposed on the inner faces of the fixed body. Four magnet and coil pairs are disposed on the four faces of the movable body and the fixed body. However, the magnetic drive mechanism disposed on the four faces occupies a large space of the shake correction drive mechanism viewed from the optical axis direction. This impairs the downsizing of an optical unit having a shake correction function In the case where the magnetic drive mechanism is disposed on the four faces, sufficient space may not be provided for routing a flexible printed circuit board from the movable body to the outer peripheral side. The flexible printed circuit board is folded toward the optical axis direction and extended along the side face of the movable body so as to prevent an excessive load from being applied to the flexible printed circuit board while the movable body is swung. For example, sufficient space for such an arrangement of the flexible printed circuit board may not be provided.

In view of such circumstances, an object of at least an embodiment of the present invention is to downsize the optical unit having a shake correction function and provide a space for routing the flexible printed circuit board.

SUMMARY

To solve the issues described above, an optical unit having a shake correction function according to at least an embodiment of the present invention includes a movable body including an optical module; a swing support mechanism that supports the movable body in a swingable manner around a first axis intersecting an optical axis and around a second axis intersecting the optical axis and the first axis; a fixed body that supports the movable body via the swing support mechanism; a shake correction drive mechanism that swings the movable body around the first axis and the second axis; and a flexible printed circuit board connected with the movable body, the movable body having a first face and a second face disposed on opposite sides of the optical axis in a first direction intersecting the optical axis and a third face and a fourth face disposed on opposite sides of the optical axis in a second direction intersecting the optical axis and the first direction, the shake correction drive mechanism being disposed on one of the first face and the second face and one of the third face and the fourth face, the flexible printed circuit board being led out from one of two faces out of the first face, the second face, the third face and the fourth face, of which two faces the shake correction drive mechanism is not disposed on either.

According to at least an embodiment of the present invention, the shake correction drive mechanism swings the movable body in two directions: around the first axis and the second axis intersecting each other. Thus, shake correction is performed in two directions. The shake correction drive mechanism may be disposed on two faces intersecting each other, among the four faces of the movable body. Thus, in comparison with the case in which the shake correction drive mechanism is disposed on all four faces, the arrangement space of the shake correction drive mechanism can be reduced. Hence, the optical unit having a shake correction function can be downsized. The flexible printed circuit board is led out from one of the two faces out of the four faces of the movable body, of which two faces the shake correction drive mechanism is not disposed on either. Thus, sufficient space is provided for leading out the flexible printed circuit board along a side face of the movable body in the optical axis direction.

In at least an embodiment of the present invention, it is preferable that the center of gravity of the optical module be offset from the optical axis, and the shake correction drive mechanism and the center of gravity of the optical axis be disposed on opposite sides of the optical axis. In this way, the center of gravity of the movable body can be brought closer to the optical axis. Thus, the impact resistance can be enhanced. Since shake correction can be performed with a small torque, the shake correction drive mechanism can be downsized. Power consumption can also be reduced.

In at least an embodiment of the present invention, the optical module may include a lens and a lens drive mechanism. It is desirable that the lens drive mechanism and the shake correction drive mechanism be disposed on opposite sides of the optical axis. In this way, the direction of center of gravity deviation due to the lens drive mechanism is made opposite to the direction of center of gravity deviation due to the shake correction drive mechanism. Thus, the center of gravity of the movable body can be brought closer to the optical axis. Hence, the impact resistance can be enhanced. Since shake correction can be performed with a small torque, the shake correction drive mechanism can be downsized. Power consumption can also be reduced.

In at least an embodiment of the present invention, the lens drive mechanism may be a magnetic drive mechanism. Disposing the lens drive mechanism and the shake correction drive mechanism on opposite sides of the optical axis can increase the distance between the lens drive mechanism and the shake correction drive mechanism. Thus, magnetic interference between the lens drive mechanism and the shake correction drive mechanism can be suppressed, even in the case where the lens drive mechanism is a magnetic drive mechanism. Thus, a reduction in precision of the shake correction and precision of the lens drive due to magnetic interference can be suppressed.

In at least an embodiment of the present invention, it is preferable that the flexible printed circuit board have a first folded portion that extends along the optical axis and is folded back once in the opposite direction, and the first folded portion extend in the optical axis direction along the face from which the flexible printed circuit board is led out. In this way, the flexible printed circuit board can readily bend when the movable body is swung. Thus, the load applied to the flexible printed circuit board can be reduced.

In at least an embodiment of the present invention, it is preferable that the movable body include the optical module and a holder frame that surrounds an outer periphery of the optical module, and the first folded portion be disposed in a gap between the optical module and the holder frame. In this way, the shift range of the first folded portion can be restricted by the optical module and the holder frame. Thus, excessive deformation of the flexible printed circuit board can be suppressed.

According to at least an embodiment of the present invention, the shake correction drive mechanism swings the movable body in two directions: around the first axis and the second axis intersecting each other. Thus, shake correction is performed in two directions. The shake correction drive mechanism is disposed on two faces among the four faces of the movable body. Thus, in comparison with the case in which the shake correction drive mechanism is disposed on all four faces, the arrangement space of the shake correction drive mechanism can be reduced. Hence, the optical unit having a shake correction function can be downsized. The flexible printed circuit board is led out from one of the two faces out of the four faces of the movable body, of which two faces the shake correction drive mechanism is not disposed on either. Thus, sufficient space is provided for leading out the flexible printed circuit board along a side face of the movable body in the optical axis direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An optical unit 1 having a shake correction function according to at least an embodiment of the present invention will now be described with reference to the accompanying drawings. In this specification, the three axes XYZ are orthogonal to each other. One side in the X-axis direction is indicated by +X, the other side is indicated by −X. One side in the Y-axis direction is +Y, and the other side is indicated by −Y. One side in the Z-axis direction is indicated by +Z and the other side by −Z. The Z axis direction coincides with the optical axis L direction of an optical module 2. The +Z direction is one side (object side) of the optical axis L direction, and the Z direction is the other side (image side) of the optical axis L direction.

Overall Configuration

Figure 1:
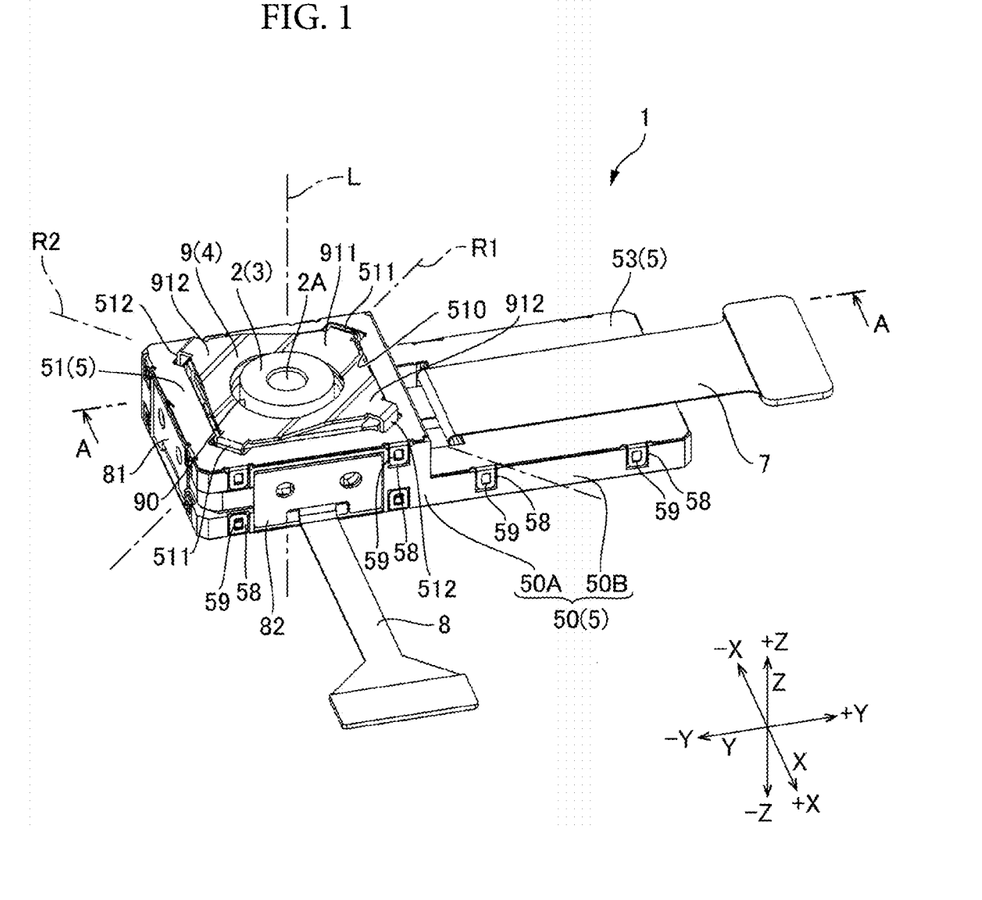
FIG. 1 is an external perspective view of an optical unit having a shake correction function according to at least an embodiment of the present invention.
Figure 2:
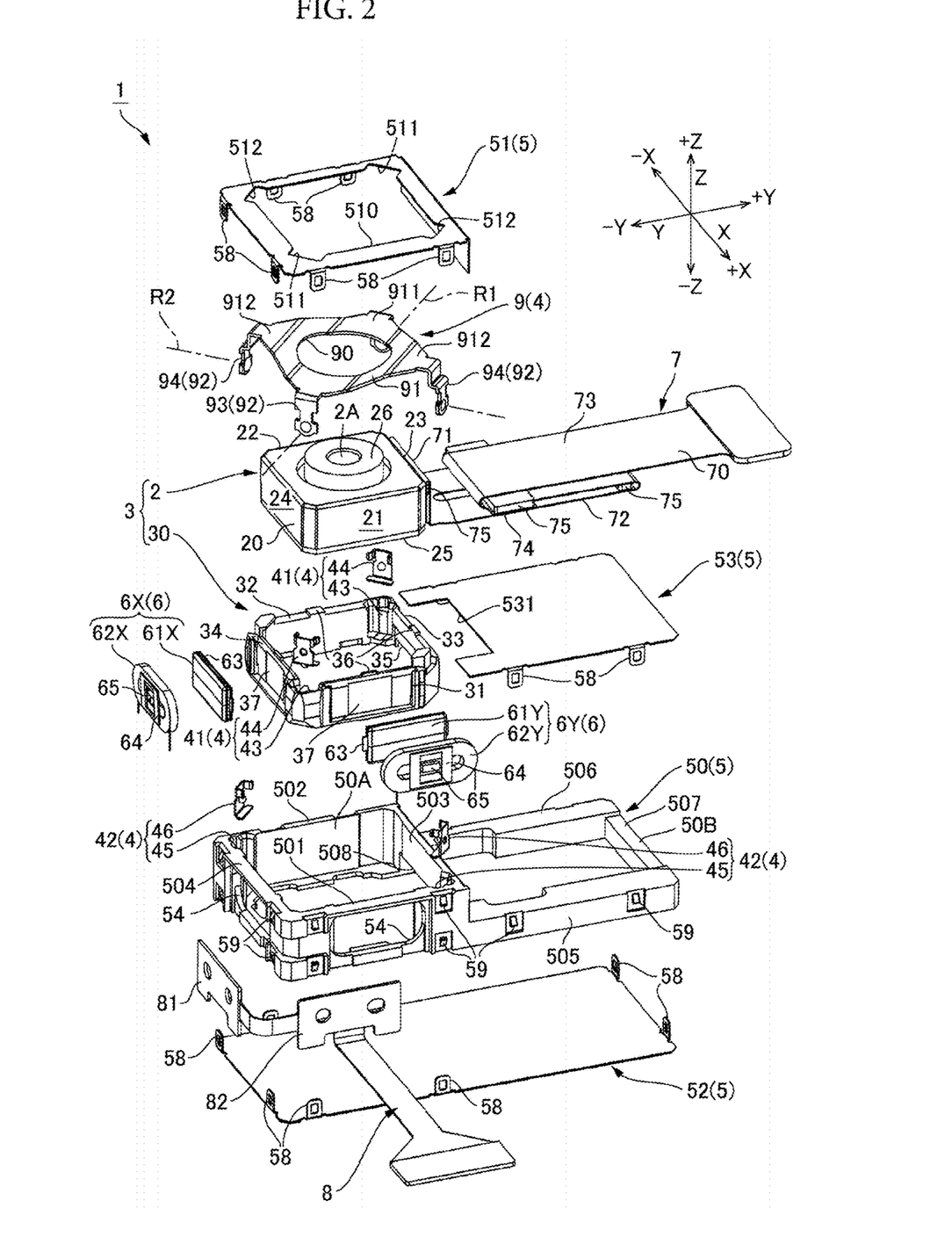
FIG. 2 is an exploded perspective view of the optical unit having a shake correction function illustrated in FIG. 1 as viewed from one side in the optical axis direction.
Figure 3:
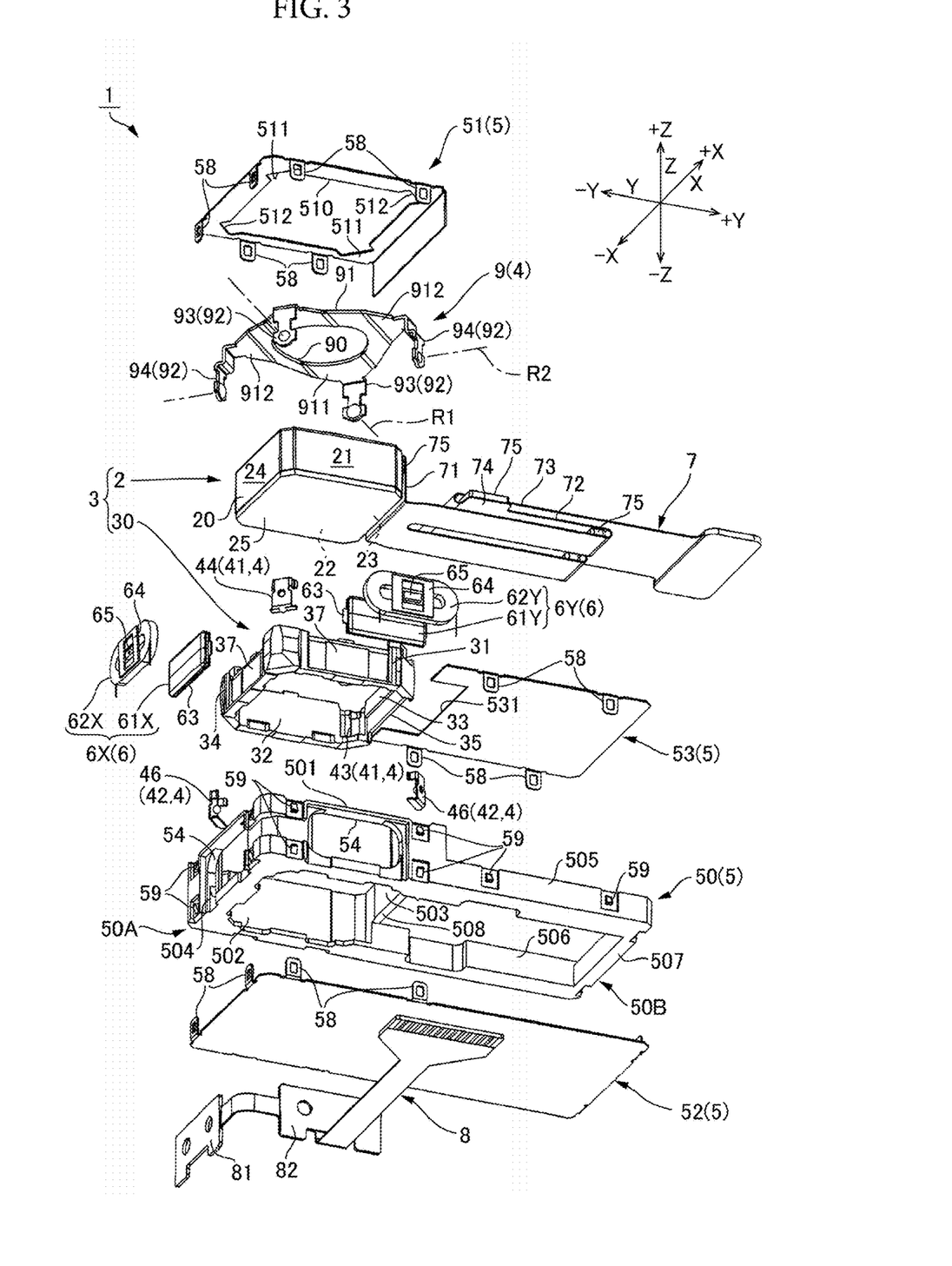
FIG. 3 is an exploded perspective view of the optical unit having a shake correction function illustrated in FIG. 1 as viewed from the other side in the optical axis direction.
Figure 4:
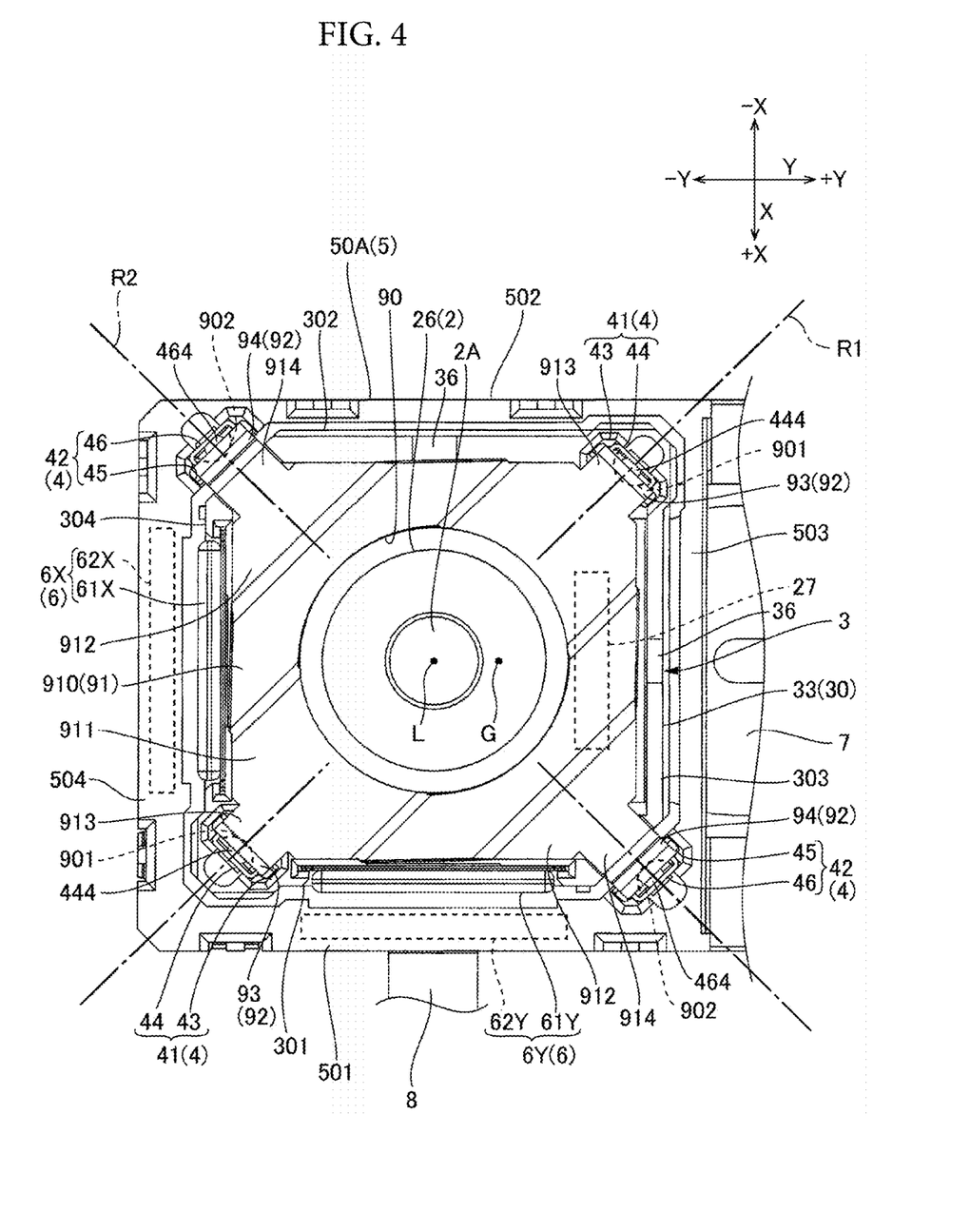
FIG. 4 is a plan view of the optical unit having a shake correction function without a cover.
Figure 5:
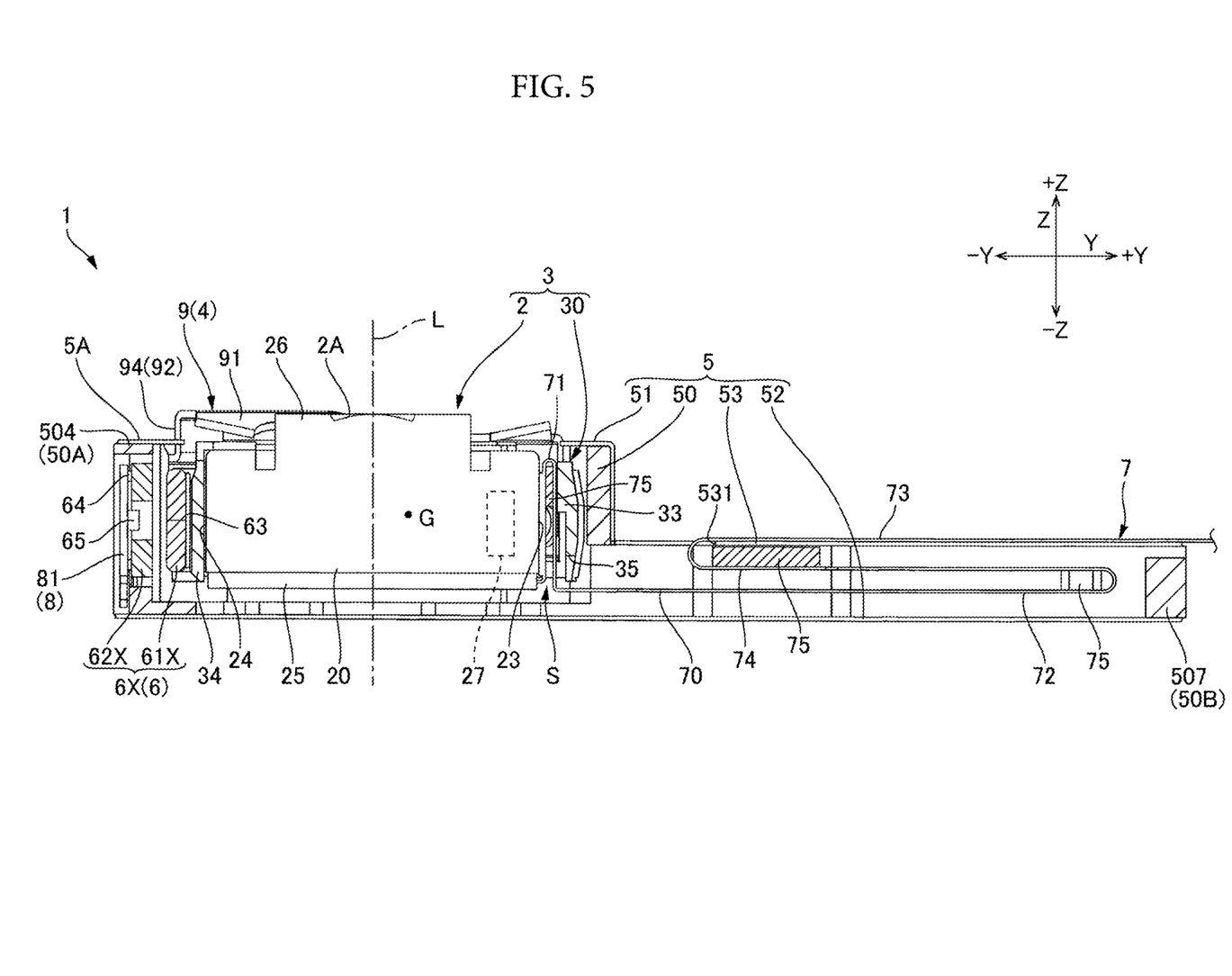
FIG. 5 is a partial cross-sectional view (partial cross-sectional view taken along line A-A in FIG. 1) of the optical unit having a shake correction function illustrated in FIG. 1.
Figure 6:
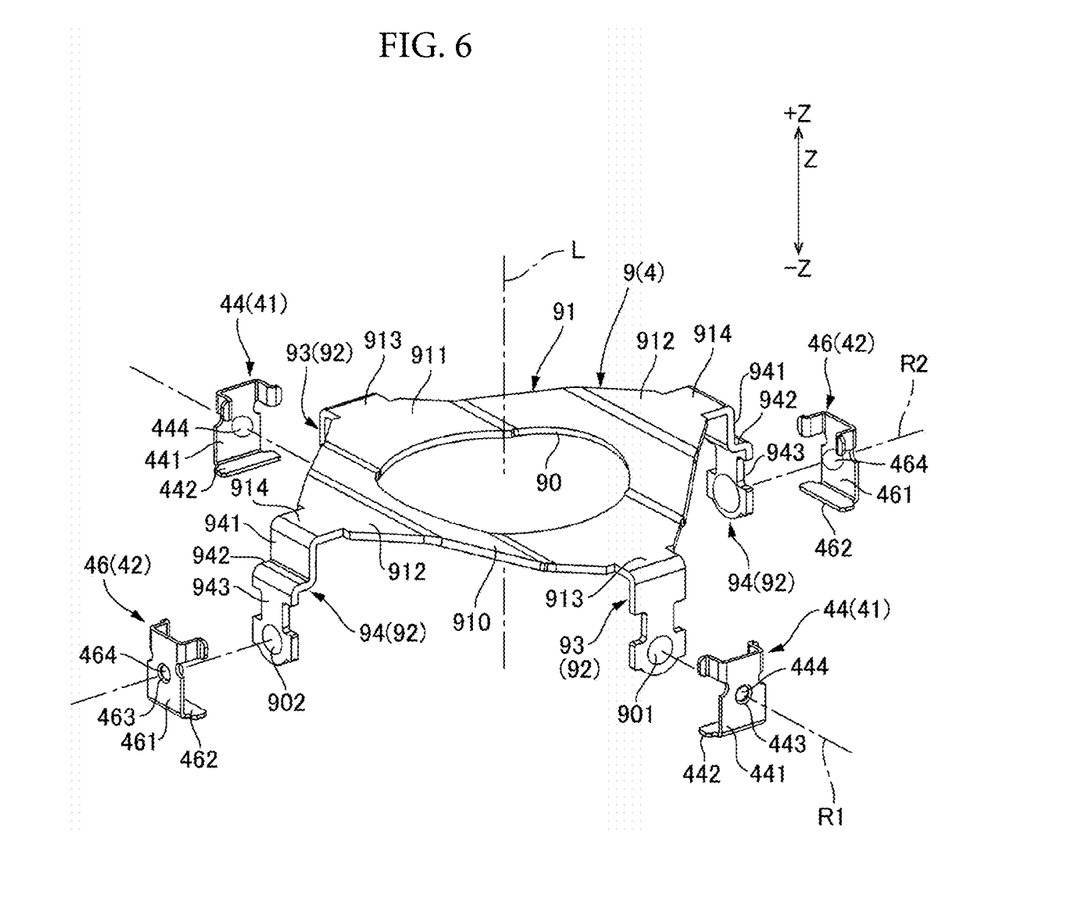
FIG. 6 is an exploded perspective view of a gimbal frame, a first thrust receiver, and a second thrust receiver.

FIG. 1 is a perspective view of an optical unit 1 having a shake correction function according to at least an embodiment of the present invention. FIG. 2 is an exploded perspective view of the optical unit 1 having a shake correction function illustrated in FIG. 1 as viewed from one side (+Z direction) of the optical axis L direction. FIG. 3 is an exploded perspective view of the optical unit 1 having a shake correction function illustrated in FIG. 1 as viewed from the other side (−Z direction) of the optical axis L direction. FIG. 4 is a plan view of the optical unit 1 having a shake correction function without a first cover 51. FIG. 5 is a partial cross-sectional view (partial cross-sectional view taken along line A-A in FIG. 1) of the optical unit 1 having a shake correction function illustrated in FIG. 1. FIG. 6 is an exploded perspective view of a gimbal frame 9, a first thrust receiver 44, and a second thrust receiver 46.

As illustrated in FIG. 1, the optical unit 1 having a shake correction function includes an optical module 2 with an optical element such as a lens. The optical unit 1 having a shake correction function is used in optical devices, such as mobile phones equipped with cameras, drive recorders, and other optical devices, such as action cameras and wearable cameras mounted on movable bodies, such as helmets, bicycles, radio-copters, etc. In such an optical device, shaking of the optical device during image capturing causes disruption in the captured image. The optical unit 1 having a shake correction function corrects the tilt of the optical module 2 on the basis of the acceleration, rotational velocity, and shake intensity, etc., detected by a detector, such as a gyroscope, to avoid tilting of the captured image.

As illustrated in FIG. 1 to FIG. 5, the optical unit 1 having a shake correction function includes a movable body 3 including an optical module 2, a gimbal mechanism 4 that swingably supports the movable body 3, a fixed body 5 that supports the movable body 3 via the gimbal mechanism 4, a shake correction drive mechanism 6 that swings the movable body 3 relative to the fixed body 5, a first flexible printed circuit board 7 connected with the movable body 3, and a second flexible printed circuit board 8 fixed to the fixed body 5. The first flexible printed circuit board 7 includes a connector disposed at the end opposite to the end connected with the movable body 3. The second flexible printed circuit board 8 has a terminal disposed at the end opposite to the end attached to the fixed body 5.

The optical unit 1 having a shake correction function swings the movable body 3 around two axes (the X axis and the Y axis) that intersect the optical axis L (the Z axis) and intersect each other, to perform shake correction. The optical unit 1 having a shake correction function performs shake correction around the X axis and the Y axis so as to performed shake correction in the pitching (vertical shake) and yawing (lateral shake) directions.

As illustrated in FIG. 1 and FIG. 4, the movable body 3 is so supported by the gimbal mechanism 4 as to be swingable around a first axis R1 orthogonal to the optical axis L (the Z axis) and a second axis R2 orthogonal to the optical axis L and the first axis R1. The first axis R1 and the second axis R2 tilt by 45 degrees relative to the X and Y axes. The combined rotation of the rotation around the first axis R1 and the rotation around the second axis R2 allows the movable body 3 to be swung around the X and Y axes. Thus, the movable body 3 is so supported by the gimbal mechanism 4 as to be swingable around the X and Y axes.

As illustrated in FIG. 4, the gimbal mechanism 4 includes first supporting point portions 41 disposed at opposing corners on the first axis R1 of the movable body 3, second supporting point portions 42 disposed at opposing corners on the second axis R2 of the fixed body 5, and a gimbal frame 9. The gimbal frame 9 is a metal flat spring. The gimbal frame 9 has two first support portions 901 disposed at the opposing corners on the first axis R1 and two second support portions 902 disposed at opposing corners on the second axis R2. The gimbal mechanism 4 is assembled such that the first support portions 901 are in point contact with the first supporting point portions 41 and the second support portions 902 are in point contact with the second supporting point portions 42. In this way, the movable body 3 is so supported by the gimbal frame 9 as to be swingable around the first axis R1 and the second axis R2.

As illustrated in FIG. 2 to FIG. 4, the shake correction drive mechanism 6 includes a first magnetic drive mechanism 6X that rotates the movable body 3 around the X axis and a second magnetic drive mechanism 6Y that rotates the movable body 3 around the Y axis. This embodiment provides one of each of the first magnetic drive mechanism 6X and the second magnetic drive mechanism 6Y.

The first magnetic drive mechanism 6X includes a magnet 61X and a coil 62X provided as a set. The second magnetic drive mechanism 6Y includes a magnet 61Y and a coil 62Y provided as a set. The magnet 61X and coil 62X of the first magnetic drive mechanism 6X face each other in the Y-axis direction. The magnet 61Y and coil 62Y of the second magnetic drive mechanism 6Y face each other in the X-axis direction. In this embodiment, the magnets 61X and 61Y are disposed on the movable body 3, and the coils 62X and 62Y are disposed on the fixed body 5. Note that the arrangement of the magnets 61X and 61Y and the coils 62X and 62Y may be the reverse of that according to this embodiment. That is, the magnets 61X and 61Y may be disposed on the fixed body 5, and the coils 62X and 62Y may be disposed on the movable body 3.

As illustrated in FIG. 4, the movable body 3 has a first face 301 and a second face 302 that face each other in the X-axis direction across the optical axis L, and a third face 303 and a fourth face 304 that face each other in the Y-axis direction across the optical axis L. The shake correction drive mechanism 6 is disposed on two faces: the first face 301 and the second face 302, or the third face 303 and the fourth face 304. In this embodiment, the second magnetic drive mechanism 6Y is disposed on the first face 301 facing the +X direction. The first magnetic drive mechanism 6X is disposed on the fourth face 304 facing the −Y direction. By limiting the number of faces on which the shake correction drive mechanism 6 is disposed to two, the optical unit 1 having a shake correction function as viewed from the Z-axis (the optical axis L) direction is reduced in size.

The first flexible printed circuit board 7 connected with the movable body 3 is led to the outside from the face on which the shake correction drive mechanism 6 is not disposed, among the peripheral faces of the movable body 3. In this embodiment, the first flexible printed circuit board 7 is let out from the third face 303 facing the +Y direction. The first flexible printed circuit board 7 is led out in a direction where the shake correction drive mechanism 6 is not disposed so as to route the first flexible printed circuit board 7 along the side face of the movable body 3 in the Z-axis (the optical axis L) direction. In this embodiment, as described below, a first folded portion 71 at which the first flexible printed circuit board 7 is folded back once in the +Z direction is disposed on the third face 303, which is the side face of the movable body 3 in the +Y direction. The first folded portion 71 extends in the optical axis L direction along the third face 303 from which the first flexible printed circuit board 7 is led out.

Movable Body

As illustrated in FIG. 2 and FIG. 3, the movable body 3 includes an optical module 2 and a holder frame 30 holding the optical module 2. The optical module 2 includes a housing 20 that has a rectangular shape in view from the optical axis L direction, a substrate 25 that is disposed at the end of the housing 20 in the −Z direction, a cylindrical portion 26 that protrudes from the housing 20 in the +Z direction, a lens group 2A (optical element) that is held in the cylindrical portion 26, and a lens drive mechanism 27 (see FIG. 4 and FIG. 5) disposed inside the housing 20.

The lens drive mechanism 27 adjusts the lens position of the lens group 2A aligned in the optical axis L direction, to focus on the object. In this embodiment, the lens drive mechanism 27 includes a magnetic drive mechanism. Note that the lens drive mechanism 27 may alternatively include a drive source besides the magnetic drive mechanism. For example, the lens drive mechanism 27 may include a motor. The lens drive mechanism 27 is disposed opposite to the first magnetic drive mechanism 6X or the second magnetic drive mechanism 6Y across the optical axis L. In this embodiment, the lens drive mechanism 27 is disposed opposite to the first magnetic drive mechanism 6X across the optical axis L.

As illustrated in FIG. 4 and FIG. 5, the center of gravity G of the optical module 2 is offset in the +Y direction, which is the side on which the lens drive mechanism 27 is disposed, with respect to the optical axis L. In the present embodiment, as described above, the lens drive mechanism 27 is disposed opposite to the first magnetic drive mechanism 6X across the optical axis L. Thus, the offset direction of the center of gravity caused by the lens drive mechanism 27 is opposite to the offset direction of the center of gravity caused by the shake correction drive mechanism 6.

The holder frame 30 is a frame-shaped member that surrounds the outer periphery of the optical module 2. The housing 20 has a first side face 21 facing the +X direction, a second side face 22 facing the −X direction, a third side face 23 facing the +Y direction, and a fourth side face 24 facing the −Y direction. The holder frame 30 includes a first frame portion 31 extending along the first side face 21 of the housing 20, a second frame portion 32 extending along the second side face 22, a third frame portion 33 extending along the third side face 23, and a fourth frame portion 34 extending along the fourth side face 24. The first frame portion 31, the second frame portion 32, and the fourth frame portion 34 abut the housing 20. A gap S is provided between the third frame portion 33 and the third side face 23 of the housing 20 (see FIG. 5). The third frame portion 33 has a cutout 35 at which the −Z direction edge is recessed the +Z direction.

The gap S provided between the third frame portion 33 and the third side face 23 of the housing 20 accommodates the first folded portion 71 at which the first flexible printed circuit board 7 is folded back once. That is, the first folded portion 71 is disposed in the gap S on the inner side of the third face 303 of the movable body 3. The first folded portion 71 extends in the Z-axis (the optical axis L) direction along the third side face 23, which is the side face of the housing 20 in the +Y direction. The first flexible printed circuit board 7 bends at a substantially right angle at the −Z direction edge of the first folded portion 71, passes through the cutout 35 in the third frame portion 33, and is led out to the +Y direction of the holder frame 30.

As illustrated in FIG. 2 and FIG. 3, the holder frame 30 includes the first supporting point portions 41 of the gimbal mechanism 4. In this embodiment, the first supporting point portions 41 are disposed in two positions: the inner face of the corner where the second frame portion 32 and the third frame portion 33 come into contact; and the inner face of the corner where the first frame portion 31 and the fourth frame portion 34 come into contact. Each of the first supporting point portions 41 includes a depression 43 depressed radially outward and the first thrust receiver 44 disposed in the depression 43. As illustrated in FIG. 6, the first thrust receiver 44 has a flat first plate portion 441 extending in the Z-axis (the optical axis L) direction, a second plate portion 442 bending at a substantially right angle at the −Z direction edge of the first plate portion 441 and extending radially inward, and a spherical body 444 fixed to the radially inward side of a through-hole 443 extending through the first plate portion 441. The second plate portion 442 abuts the inner face in the −Z direction of the depression 43 in the holder frame 30 in the Z-axis (optical axis L) direction, and thereby positions the first supporting point portion 41 in the Z-axis (optical axis L) direction.

The first thrust receiver 44 is composed of metal. The spherical body 444 is fixed to the first plate portion 441 by welding. The spherical body 444 is in point contact with the corresponding first support portion 901 in the gimbal frame 9. The first support portion 901 has a concave face having a curvature radius larger than the radius of the spherical body 444. The first support portion 901 elastically contacts the spherical body 444 on the radially inward side.

The holder frame 30 includes protrusions 36 that protrude from end faces in the +Z direction of the first frame portion 31, the second frame portion 32, the third frame portion 33, and the fourth frame portion 34. The protrusions 36 are disposed at the centers of the first frame portion 31 and the second frame portion 32 in the Y-axis direction and the centers of the third frame portion 33 and the fourth frame portion 34 in the X-axis direction. The four protrusions 36 have the same protruding height in the +Z direction. The protrusions 36 serve as stoppers that restrict the swinging range of the movable body 3 around the first axis R1 and the second axis R2. That is, when the movable body 3 is swung around the first axis R1 and the second axis R2, the swinging range of the movable body 3 is restricted by the protrusions 36 coming into contact with the fixed body 5. As described below, the fixed body 5 includes a first cover 51 facing the outer peripheral portion of the movable body 3 in the Z-axis (optical axis L) direction. Thus, the swinging range of the movable body 3 is restricted by the protrusions 36 coming into contact with the first cover 51.

The holder frame 30 includes magnet arrangement recesses 37 that accommodate the magnet 61X of the first magnetic drive mechanism 6X and the magnet 61Y of the second magnetic drive mechanism 6Y. In this embodiment, the magnet arrangement recesses 37 are formed in the first frame portion 31 and the fourth frame portion 34. The magnet arrangement recesses 37 depress radially inward. In this embodiment, the holder frame 30 is composed of resin. Thus, plate-like yoke members 63 are disposed in the magnet arrangement recesses 37. The yoke members 63 are fixed to the inner faces of the magnet arrangement recesses 37, and the magnets 61X and 61Y are fixed to the radially outer faces of the yoke members 63. The radially outward faces of magnets 61X and 61Y are magnetized differently from each other relative to the magnetization polarization line disposed at the substantial center in the Z-axis (optical axis L) direction.

Fixed Body

The fixed body 5 includes a case 50, a first cover 51 and a second cover 52 fixed to the case 50, and a wiring cover 53. In this embodiment, the case 50 is composed of resin. The first cover 51, the second cover 52, and the wiring cover 53 are composed of nonmagnetic metal. The case 50 includes an outer frame portion 50A that surrounds the outer periphery of the movable body 3, and a wiring housing portion 50B that protrudes in the +Y direction from the −Z direction edge of the outer frame portion 50A. The first cover 51 is fixed to the +Z direction edge of the outer frame portion 50A. The second cover 52 is fixed to the −Z direction edges of the outer frame portion 50A and the wiring housing portion 50B. The wiring cover 53 is fixed to the +Z direction edge of the wiring housing portion 50B.

Elastic engagements 58 are disposed on the outer periphery of the first cover 51, the second cover 52, and the wiring cover 53. Hooks 59 are disposed on the outer peripheral face of the case 50. The elastic engagements 58 are metal pieces extending in the Z-axis (optical axis L) direction and have openings into which the hooks 59 are fitted. The hooks 59 protrude radially outward from the inner faces of recesses formed in the outer peripheral face of the case 50. The first cover 51, the second cover 52, and the wiring cover 53 are fixed to the case 50 by engaging the elastic engagements 58 with the hooks 59.

Two of the elastic engagements 58 extending in the Z direction are disposed on each of the three edges of the first cover 51 other than the +Y direction edge. The hooks 59 are disposed on the outer peripheral face at the +Z direction edge of the outer frame portion 50A at positions corresponding to the elastic engagements 58 disposed on the first cover 51. Two of the elastic engagements 58 extending in the +Z direction are disposed on each of the four edges of the second cover 52. The hooks 59 corresponding to the elastic engagements 58 of the second cover 52 are disposed on the Z direction edges of the outer peripheral faces of the outer frame portion 50A and the wiring housing portion 50B. Two of the elastic engagements 58 extending in the −Z direction are disposed on the +X and −X direction edges of the wiring cover 53. The hooks 59 corresponding to the elastic engagements 58 of the wiring cover 53 are disposed on the +Z direction edges of the outer peripheral faces of the wiring housing portion 50B.

The first cover 51 faces the outer peripheral portion of the movable body 3 disposed on the inner side of the outer frame portion 50A in the Z-axis direction, and restricts the movable body 3 from being ejected in the +Z direction. The first cover 51 has a substantially rectangular opening portion 510. In this embodiment, a portion of the gimbal frame 9 protrudes through the opening portion 510 in the +Z direction. The cylindrical portion 26 of the optical module 2 protrudes in the +Z direction through a central hole 90 in the radial center of the gimbal frame 9. The first cover 51 is disposed at the +Z direction edge of the fixed body 5. Thus, in this embodiment, portions of the optical module 2 and the gimbal frame 9 protrude farther in the +Z direction from the +Z direction edge of the fixed body 5.

In this embodiment, the +Z direction end portion or a first end portion 5A (see FIG. 5) of the fixed body 5 is the +Z direction face of the first cover 51. As described below, the gimbal frame 9 includes a first frame portion 91 disposed farther in the +Z direction from the first end portion 5A. The movable body 3 includes the cylindrical portion 26 which is a protrusion of the movable body disposed farther in the +Z direction from the first end portion 5A.

The outer frame portion 50A includes a first frame portion 501 and a second frame portion 502 extending parallel to each other from the Y-axis direction on the +X and −X direction sides of the movable body 3, and a third frame portion 503 and a fourth frame portion 504 extending parallel to each other in the X-axis direction on the +Y and −Y direction sides of the movable body 3. The wiring housing portion 50B includes a fifth frame portion 505 and a sixth frame portion 506 extending parallel to each other in the +Y direction from the −Z direction edges of the first frame portion 501 and the second frame portion 502, and a seventh frame portion 507 connected with the +Y direction ends of the fifth frame portion 505 and the sixth frame portion 506 and extending in the X-axis direction.

The outer frame portion 50A includes the second supporting point portions 42 of the gimbal mechanism 4. In this embodiment, the second supporting point portions 42 are disposed in two positions: the inner face of the corner where the first frame portion 501 and the third frame portion 503 come into contact; and the inner face of the corner where the second frame portion 502 and the fourth frame portion 504 come into contact. Each of the second supporting point portions 42 includes a depression 45 depressed radially outward and the second thrust receiver 46 disposed in the depression 45. As illustrated in FIG. 6, the second thrust receiver 46 has a first plate portion 461 extending in the optical axis L direction, a second plate portion 462 bending at a substantially right angle at the edge of the first plate portion 461 in the −Z direction and extending radially inward, and a spherical body 464 fixed to the radially inward side of a through-hole 463 extending through the first plate portion 461. The second plate portion 462 abuts the inner face in the −Z direction of the depression 45 of the outer frame portion 50A in the Z-axis (optical axis L) direction, and thereby positions the second supporting point portion 42 in the Z-axis (optical axis L) direction.

The second thrust receiver 46 is composed of metal. The spherical body 464 is fixed to the first plate portion 461 by welding. The spherical body 464 is in point contact with the corresponding second support portion 902 in the gimbal frame 9. The second support portion 902 has a concave face having a curvature radius larger than the radius of the spherical body 464. The second support portion 902 elastically contacts the spherical body 464 on the radially inward side.

The outer frame portion 50A includes a coil arrangement hole 54 in which the coil 62X of the first magnetic drive mechanism 6X and the coil 62Y of the second magnetic drive mechanism 6Y are fixed by an adhesive agent or the like. In this embodiment, the coil arrangement hole 54 extends through the first frame portion 501 and the fourth frame portion 504. The coils 62X and 62Y are oblong coreless coils. The two long sides of each of the coils 62X and 62Y on the +Z and −Z direction sides are used as effective sides. The second flexible printed circuit board 8 is fixed to the outer frame portion 50A from the radially outward side relative to the first frame portion 501 and the fourth frame portion 504. The second flexible printed circuit board 8 has a first substrate portion 81 that aligns with the coil arrangement hole 54 of the fourth frame portion 504 from the radially outward side, and a second substrate portion 82 that aligns with the coil arrangement hole 54 of the first frame portion 501 from the radially outward side.

Rectangular magnetic plates 64 are disposed between the first substrate portion 81 and the coil 62X and between the second substrate portion 82 and the coil 62Y. The magnetic plate 64 disposed between the first substrate portion 81 and the coil 62X faces the magnet 61X and constitutes a magnetic spring that returns the movable body 3 to a reference rotation position in the rotation direction around the X axis. The magnetic plate 64 disposed between the second substrate portion 82 and the coil 62Y faces the magnet 61Y and constitutes a magnetic spring that returns the movable body 3 to a reference rotation position in the rotation direction around the Y axis.

The magnetic plates 64 each has a rectangular through-hole at a position in alignment with the center holes of the coils 62X and 62Y. A magnetic sensor 65 is disposed in the through-hole. The magnetic sensor 65 is, for example, a Hall element. The optical unit 1 having a shake correction function detects the swinging angle around the X axis of the movable body 3 from the output of the magnetic sensors 65 disposed at the center of the coils 62X. The swinging angle around the Y axis of the movable body 3 is detected from the output of the magnetic sensors 65 disposed at the center of the coils 62Y.

Gimbal Frame

As illustrated in FIG. 6, the gimbal frame 9 includes a first frame portion 91 that has a substantially square shape in view from the Z-axis direction, and second frame portions 92 that are bent substantially at right angles from the four corners of the first frame portion 91 and extend in the −Z direction. The second frame portions 92 are disposed at first diagonal positions of the first frame portion 91 on both sides in the first axis R1 direction and at second diagonal positions of the first frame portion 91 on both sides in the second axis R2 direction. A central hole 90 that passes through the first frame portion 91 is formed in the center of the first frame portion 91. As illustrated in FIG. 5, the first frame portion 91 aligns with the housing 20 of the optical module 2 and the holder frame 30 in view from the Z-axis (optical axis L) direction.

The first frame portion 91 has a square portion 910 having diagonal corners aligned with the first axis R1 and the second axis R2 direction in view from the Z-axis (optical axis L), first protruding portions 913 that protrude radially outward from the two corners of the square portion 910 along the first axis R1 direction, and second protruding portions 914 that protrude radially outward from the two corners of the square portion 910 along the second axis R2 direction. As illustrated in FIG. 4, the first frame portion 91 is disposed on the inner peripheral side of the holder frame 30 in view from the Z-axis (optical axis L) direction, except for the second protruding portions 914 disposed at the corners along the second axis R2 direction among the four corner portions (the first protruding portions 913 and the second protruding portions 914) connected with the second frame portions 92.

As illustrated in FIG. 1 and FIG. 6, a central portion 911 of the square portion 910 of the first frame portion 91 disposed at the center in the second axis R2 direction is depressed in the −Z direction. The corner portions 912 at both ends in the second axis R2 direction are disposed +Z direction side of the central portion 911. That is, in the first frame portion 91, the corner portions 912 along the second axis R2 direction are farther from the movable body 3 than the central portion 911. Thus, a collision of the movable body 3 and the gimbal frame 9 can be avoided even when the movable body 3 is swung around the first axis R1 on the −Z direction side of the gimbal frame 9 and the two ends of the movable body 3 along the second axis R2 direction (in this embodiment, the corner portion of the housing 20 along the second axis R2 direction) shift to the Z-axis direction.

The central portion 911 extends to the corner portions of the first frame portion 91 along the first axis R1 direction. Here, the corner portions of the first frame portion 91 along the first axis R1 are portions of the gimbal frame 9 that shift the most around the second supporting point portions 42 and the second axis R2 in the Z-axis (optical axis L) direction when the movable body 3 is swung around the second axis R2. Thus, in the case where the corner portions of the first frame portion 91 along the first axis R1 direction are depressed the most in the −Z direction, the space in which the gimbal frame 9 shifts while the movable body 3 is swung can be reduced in the Z-axis (optical axis L) direction. Thus, the required height of the space in which the optical unit 1 having a shake correction function is disposed can be reduced in the Z-axis (optical axis L) direction.

The second frame portion 92 includes first-support-portion extensions 93 disposed at the two corner portions of the gimbal frame 9 along the first axis R1 direction, and second-support-portion extensions 94 disposed at the two corner portions of the gimbal frame 9 along the second axis R2 direction. The first-support-portion extensions 93 linearly extend in the −Z direction from the first protruding portion 913 at the corners of the first frame portion 91 in the first axis R1 direction. The first support portions 901, which are concave faces depressed radially inward, are pressed into the distal portions of the first-support-portion extensions 93. The second support extension portion 94 each includes a first portion 941 that extends in the −Z direction from the corresponding second protruding portion 914 at one of the corners of the first frame portion 91 along the second axis R2 direction, a second portion 942 that is bent at a substantial right angle from the first portion 941 and extends radially outward, and a third portion 943 that is bent at a substantial right angle and extends in the −Z direction. The second support portions 902, which are concave faces depressed radially inward, are pressed into the distal portions of the third portions 943.

The first-support-portion extensions 93 are disposed in recesses 511 at which the corner portions along the first axis R1 direction of the opening portion 510 of the first cover 51 are cutout radially outward. The first supporting point portions 41, which are the supports for the gimbal mechanism 4 provided on the movable body 3, are disposed on the −Z direction side of the recesses 511. The distal portions of the first-support-portion extensions 93 are supported by the first supporting point portions 41. The second-support-portion extensions 94 are disposed in recesses 512 at which the corner portions along the second axis R2 direction of the opening portion 510 of the first cover 51 are cutout radially outward. The second supporting point portions 42, which are the supports for the gimbal mechanism 4 provided on the fixed body 5, are disposed on the −Z direction side of the recesses 512. The distal portions of the second-support-portion extensions 94 are supported by the second supporting point portions 42.

The first-support-portion extensions 93 and the second-support-portion extensions 94 elastically deform in the radial direction. Thus, the first support portions 901 disposed at the distal portions of the first-support-portion extensions 93 are in elastic contact with the spherical bodies 444 disposed on the first supporting point portions 41. The second support portions 902 disposed at the distal portions of the second-support-portion extensions 94 are in elastic contact with the spherical bodies 464 disposed on the second supporting point portions 42. In this way, the first-support-portion extensions 93 and the second-support-portion extensions 94 do not readily detach from the first supporting point portions 41 and the second supporting point portions 42, respectively, and suppress shaking of the supporting point portions.

Routing Shape of First Flexible Printed Circuit Board 7

The first flexible printed circuit board 7 is folded back on the inner side of the holder frame 30 to form the first folded portion 71, led out from the cutout 35 in the holder frame 30 in the +Y direction, folded back inside the outer frame portion 50A, and extends from a cutout 508 in the −Z direction edge of the third frame portion 503 of the outer frame portion 50A toward the +Z direction, toward the inner side of the wiring housing portion 50B. The first flexible printed circuit board 7 has a second folded portion 72 at which the first flexible printed circuit board 7 extending in the +Y direction inside the wiring housing portion 50B is folded back once in the opposite direction, and a third folded portion 73 that overlays the second folded portion 72 on the +Z direction side.

The wiring cover 53 has a cutout 531 in which the substantial center of the edge in the −Y direction is cutout in the +Y direction. The third folded portion 73 of the first flexible printed circuit board 7 is led out from the cutout 531 to the outside of the wiring housing portion 50B, and extends in the +Y direction side along the wiring cover 53. The first flexible printed circuit board 7 includes a fixing portion 74 that is fixed to the wiring cover 53. The fixing portion 74 is fixed to the edge of the cutout 531.

The first flexible printed circuit board 7 includes a flexible substrate 70 and reinforcing plates 75 fixed to the flexible substrate 70. The reinforcing plates 75 are disposed at three positions: the first folded portion 71, the second folded portion 72, and the fixing portion 74. In the first folded portion 71 and the second folded portion 72, the reinforcing plates 75 are disposed between the bent portions of the flexible substrate 70 bent in opposite directions. Thus, the reinforcing plates 75 are disposed between the flexible substrate 70 and serve as spacers. The reinforcing plate 75 disposed on the fixing portion 74 is disposed between the wiring cover 53 and the flexible substrate 70 and serves as a spacer between the wiring cover 53 and the flexible substrate 70.

Figure 7:
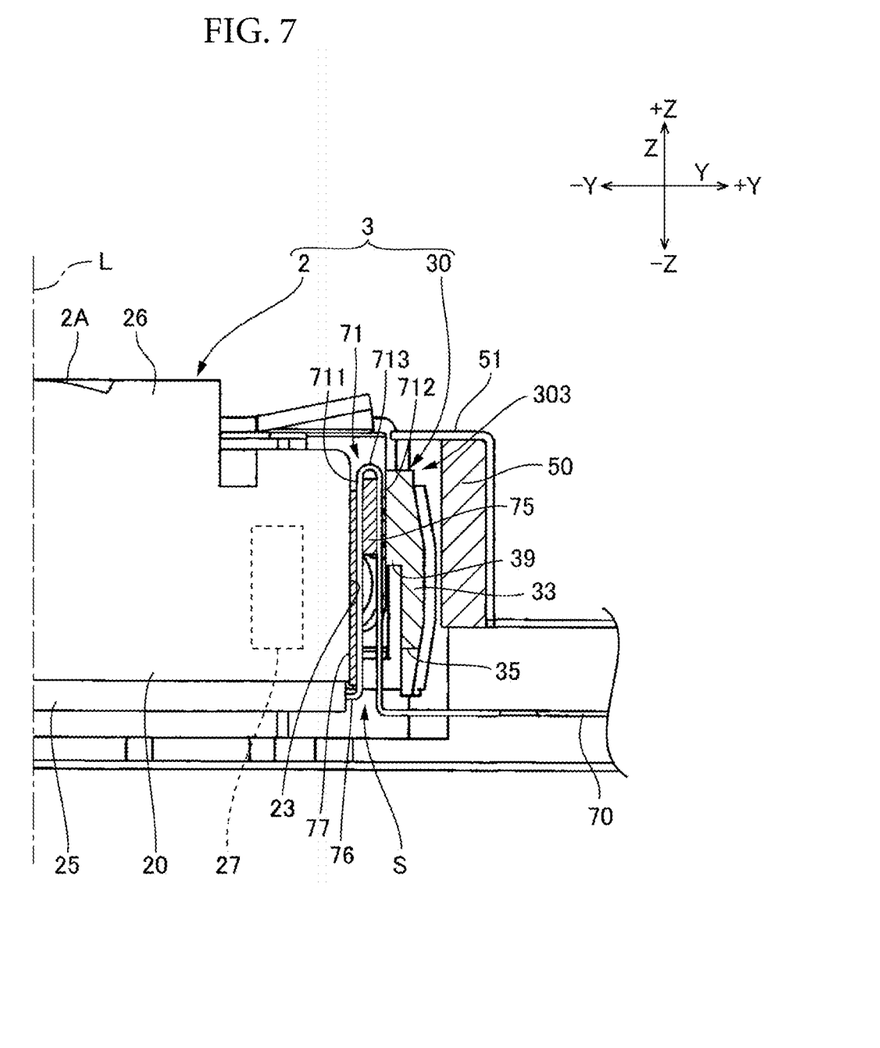
FIG. 7 is a partial enlarged cross-sectional view of the optical unit having a shake correction function illustrated in FIG. 1.

FIG. 7 is a partial enlarged cross-sectional view of the optical unit 1 having a shake correction function illustrated in FIG. 1, and is an enlarged view of a portion from which the first flexible printed circuit board 7 is led out. As described above, the movable body 3 is provided with a radial gap S between the third side face 23 of the optical module 2 and the third frame portion 33 of the holder frame 30. The first folded portion 71 is disposed in the gap S. The third frame portion 33 of the holder frame 30 includes a protrusion 39 that protrudes toward the optical module 2 (the −Y direction) side. The first folded portion 71 is disposed between the end face of the protrusion 39 and the third side face 23 of the optical module 2.

The first flexible printed circuit board 7 has a lead-out portion 76 that is led out from the movable body 3 in the +Y direction. The lead-out portion 76 has a first extending portion 711 that is bent from the first folded portion 71 toward forward side (+Z direction) in the optical axis L direction, a second extending portion 712 that extends to the rear side (−Z direction) in the optical axis L direction on the +Y direction side of the first extending portion 711, and a bending portion 713 that extends from the first extending portion 711 to bend in the opposite direction and is connected with the second extending portion 712. The first extending portion 711 is fixed to the third side face 23 of the optical module 2 by a double-sided tape 77. Note that the first extending portion 711 may be fixed by an adhesive agent besides the double-sided tape 77.

The reinforcing plates 75 disposed on the first folded portion 71 are disposed between the first extending portion 711 and the second extending portion 712 closest to the bending portion 713 (farthest on +Z direction side) in the optical axis L direction. Thus, the second extending portion 712 extending from the reinforcing plates 75 to the −Z direction of the first folded portion 71 is not fixed to other components and can be readily bent. Thus, when the movable body 3 is swung around the X axis, the load applied to the first flexible printed circuit board 7 is small.

The first flexible printed circuit board 7 includes, as well as the first folded portion 71, the second folded portion 72 that extends in the Y-axis direction inside the wiring housing portion 50B. Thus, when the movable body 3 is swung around the Y-axis, the second folded portion 72 can readily bend. Thus, the load applied to the first flexible printed circuit board 7 is small.

Main Advantageous Effects of this Embodiment

As described above, the optical unit 1 having a shake correction function according to this embodiment includes a movable body 3 including an optical module 2, a gimbal mechanism 4 that supports the movable body 3 in a swingable manner around a first axis R1 intersecting the optical axis L and a second axis R2 intersecting the first axis R1, a fixed body 5 that supports the movable body 3 via the gimbal mechanism 4, a shake correction drive mechanism 6 that swings the movable body 3 around the first axis R1 and the second axis R2, and a first flexible printed circuit board 7 that is connected with the movable body 3. The movable body 3 has a first face 301 and a second face 302 that face each other across the optical axis L in a first direction (the X-axis direction) intersecting the optical axis L, and a third face 303 and a fourth face 304 that face each other across the optical axis L in a second direction (the Y-axis direction) intersecting the first direction (the X-axis direction). The shake correction drive mechanism 6 is disposed on two faces: the first face 301 and the second face 302, or the third face 303 and the fourth face 304. In this embodiment, the shake correction drive mechanism 6 is disposed he first face 301 and the fourth face 304. The first flexible printed circuit board 7 is led out from the third face 303, among the two faces not provided with the shake correction drive mechanism 6.

In this embodiment as described above, the shake correction drive mechanism 6 swings the movable body 3 in two directions: around the first axis R1 and the second axis R2 intersecting each other. Thus, shake correction can be performed in two directions. The shake correction drive mechanism 6 is disposed on two faces intersecting each other, among the four faces of the movable body 3. Thus, in comparison with the case in which the shake correction drive mechanism 6 is disposed on all four faces, the arrangement space of the shake correction drive mechanism 6 can be reduced. Thus, the optical unit 1 having a shake correction function can be downsized. The first flexible printed circuit board 7 is led out from one of the two faces of the movable body 3 not provided with the shake correction drive mechanism 6. Thus, sufficient space can be provided for leading out the first flexible printed circuit board 7 along the side face of the movable body 3 in the optical axis L direction.

Note that the shake correction drive mechanism 6 may be disposed at any position beside that described above. For example, the first magnetic drive mechanism 6X may be disposed on the second face 302 besides the first face 301. When the shake correction drive mechanism 6 is disposed on the first face 301 and the fourth face 304, the first flexible printed circuit board 7 may be led out from the second face 302. In such a case, the wiring housing portion 50B is disposed on the −X direction side of the outer frame portion 50A.

In this embodiment, the first flexible printed circuit board 7 has a first folded portion 71 that extends along the optical axis L and is folded back once in the opposite direction. The first folded portion 71 extends in the optical axis L direction along the face from which the first flexible printed circuit board 7 is led out. Thus, when the movable body 3 is swung, the first folded portion 71 can be readily bent. Thus, the load applied to the first flexible printed circuit board 7 can be reduced.

In this embodiment, the first folded portion 71 of the first flexible printed circuit board 7 is disposed in a gap S between the third side face 23 of the optical module 2 and the third frame portion 33 of the holder frame 30. In this way, the shift range of the first folded portion 71 can be restricted by the optical module 2 and the holder frame. Thus, the first flexible printed circuit board 7 can be prevented from being subjected to excessive deformation.

In this embodiment, it is desirable that the center of gravity G of the optical module 2 be offset from the optical axis L, and the shake correction drive mechanism 6 and the center of gravity G of the optical axis L be disposed on opposite sides of the optical axis L. In this way, the center of gravity G of the movable body 3 can be brought closer to the optical axis L. Thus, impact resistance can be enhanced. Since shake correction can be performed with a small torque, the shake correction drive mechanism 6 can be downsized. Power consumption can also be reduced.

In this embodiment, the optical module 2 includes a lens and a lens drive mechanism 27. It is desirable that the lens drive mechanism 27 and the shake correction drive mechanism 6 be disposed on opposite sides of the optical axis L. In this way, the offset direction of the center of gravity due to the lens drive mechanism 27 is opposite to the offset direction of the center of gravity due to the shake correction drive mechanism 6. Thus, the center of gravity of the movable body 3 can be brought close to the optical axis L. Thus, impact resistance can be enhanced. Since shake correction can be performed with a small torque, the shake correction drive mechanism 6 can be downsized. Power consumption can also be reduced.

In this embodiment, the lens drive mechanism 27 is a magnetic drive mechanism. By disposing the lens drive mechanism 27 and the shake correction drive mechanism 6 on opposite sides of the optical axis L, magnetic interference between the lens drive mechanism 27 and the shake correction drive mechanism 6 can be suppressed even when the lens drive mechanism 27 is a magnetic drive mechanism. Thus, a reduction in the precision of the shake correction and the precision of the lens drive due to magnetic interference can be suppressed.

Modification

Figure 8:
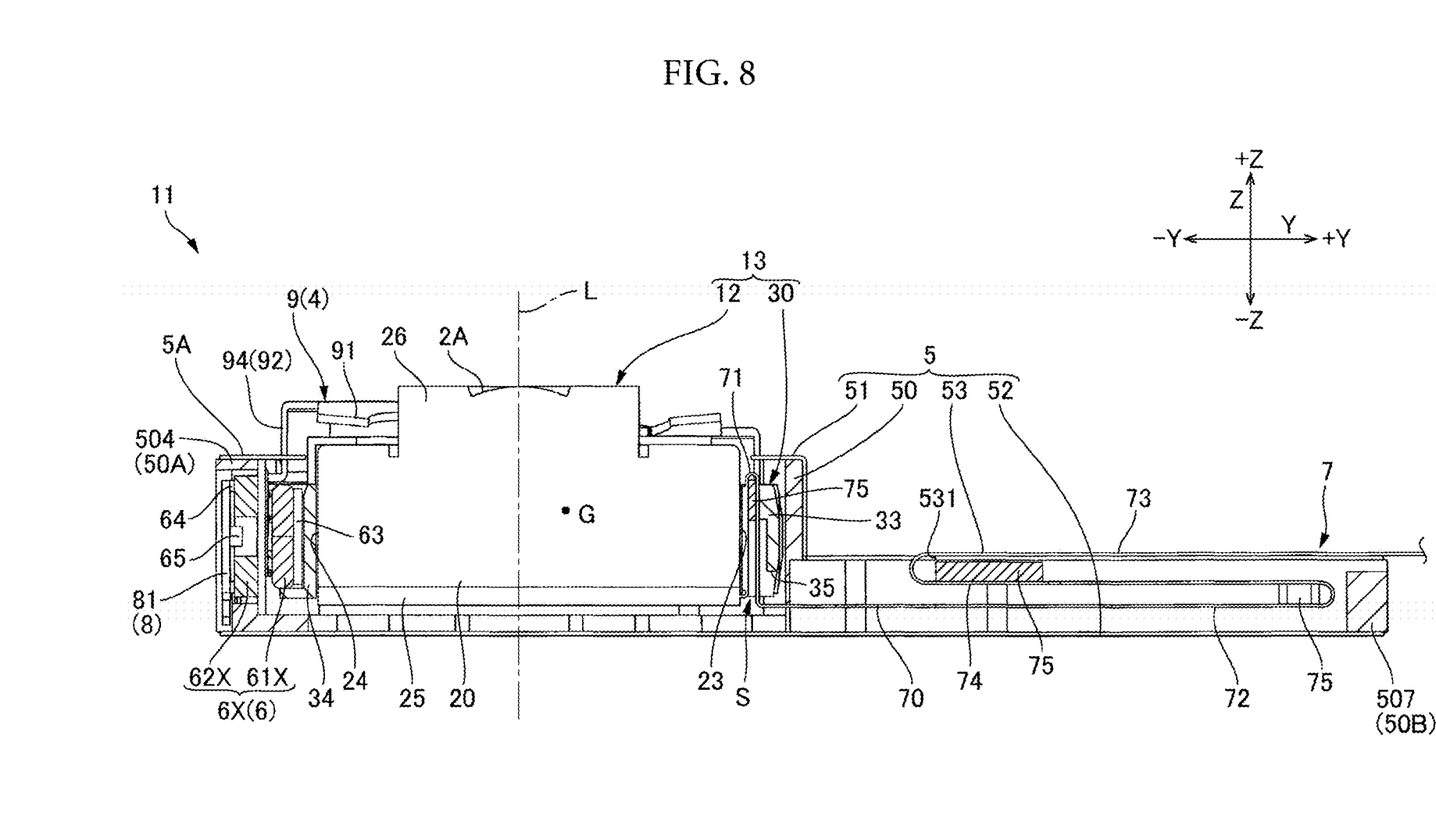
FIG. 8 is a partial cross-sectional view of an optical unit having a shake correction function including an optical module according to a modification.

FIG. 8 is a partial cross-sectional view of an optical unit 11 having a shake correction function including an optical module 12 according to a modification. In the above-described embodiment, the optical module 12 has a symmetrical shape in the Y-axis direction about the optical axis L. However, the optical module 12 of the optical unit 11 having a shake correction function according to the modification has an asymmetrical shape in the Y-axis direction about the optical axis L, as illustrated in FIG. 8. In the embodiment illustrated in FIG. 8, the optical module 12 has a rectangular shape long in the +Y direction, not a square shape, in view from the optical axis L. Thus, the center of gravity G of the optical module 12 is offset from the optical axis L in the +Y direction. Thus, a first magnetic drive mechanism 6X disposed on the −Y direction face of a movable body 13 causes the center of gravity G of the optical module 12 and the first magnetic drive mechanism 6X to be disposed on opposite sides of the optical axis L. Thus, the center of gravity of the movable body 13 can be brought close to the optical axis L.

What is claimed is:

1. An optical unit having a shake correction function, comprising:
    a movable body including an optical module;
    a swing support mechanism that supports the movable body in a swingable manner around a first axis intersecting an optical axis and around a second axis intersecting the optical axis and the first axis;
    a fixed body that supports the movable body via the swing support mechanism;
    a shake correction drive mechanism that swings the movable body around the first axis and the second axis; and
    a flexible printed circuit board connected with the movable body,
    the movable body having a first face and a second face disposed on opposite sides of the optical axis in a first direction intersecting the optical axis and a third face and a fourth face disposed on opposite sides of the optical axis in a second direction intersecting the optical axis and the first direction,
    the shake correction drive mechanism being disposed on only one of the first face and the second face and only one of the third face and the fourth face so that the shake correction drive mechanism is not disposed on a remaining one of the first face and the second face and a remaining one of the third face and the fourth face,
    the flexible printed circuit board being led out from one of two faces out of the first face, the second face, the third face and the fourth face, of which two faces the shake correction drive mechanism is not disposed on either.

2. The optical unit having a shake correction function according to claim 1, wherein
    the optical module has a center of gravity offset from the optical axis, and
    the shake correction drive mechanism and the center of gravity of the optical module are disposed on opposite sides of the optical axis.

3. The optical unit having a shake correction function according to claim 1, wherein
    the optical module includes a lens and a lens drive mechanism, and
    the lens drive mechanism and the shake correction drive mechanism are disposed on opposite sides of the optical axis.

4. The optical unit having a shake correction function according to claim 3, wherein the lens drive mechanism includes a magnetic drive mechanism.

5. The optical unit having a shake correction function according to claim 1, wherein
    the flexible printed circuit board has a first folded portion that extends in a direction of the optical axis and is folded back once in an opposite direction, and
    the first folded portion extends in the direction of the optical axis along a face from which the flexible printed circuit board is led out.

6. The optical unit having a shake correction function according to claim 5, wherein
    the movable body includes the optical module and a holder frame that surrounds an outer periphery of the optical module, and
    the first folded portion is disposed in a gap between the optical module and the holder frame.

* * * * *